(12) United States Patent
Stephan et al.

(10) Patent No.: US 10,049,689 B2
(45) Date of Patent: Aug. 14, 2018

(54) METHODS OF FORMING MAGNETIC DEVICES WITH VARIABLE OVERCOATS

(71) Applicant: SEAGATE TECHNOLOGY LLC, Cupertino, CA (US)

(72) Inventors: Joseph Michael Stephan, Eden Prairie, MN (US); Douglas H. Cole, Burnsville, MN (US); Daniel Richard Buettner, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/248,682

(22) Filed: Aug. 26, 2016

(65) Prior Publication Data

US 2017/0061994 A1    Mar. 2, 2017

Related U.S. Application Data

(60) Provisional application No. 62/210,522, filed on Aug. 27, 2015.

(51) Int. Cl.
*G11B 11/00* (2006.01)
*G11B 5/31* (2006.01)
(Continued)

(52) U.S. Cl.
CPC ............ *G11B 5/3163* (2013.01); *G11B 5/102* (2013.01); *G11B 5/3106* (2013.01); *G11B 5/6082* (2013.01); *G11B 5/314* (2013.01); *G11B 5/4866* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| 5,768,055 A | 6/1998 | Tian |
| 5,774,303 A | 6/1998 | Teng |

(Continued)

FOREIGN PATENT DOCUMENTS

| CN | 1177169 | 3/1998 |
| CN | 101887730 | 11/2010 |

(Continued)

*Primary Examiner* — Tan X Dinh
(74) *Attorney, Agent, or Firm* — Mueting, Raasch & Gebhardt, P.A.

(57) ABSTRACT

Methods that include depositing a first layer over the entire surface of a structure, the structure having a magnetic reader and a magnetic writer, wherein the magnetic reader and the magnetic writer are positioned adjacent to each other on a substrate and the magnetic writer includes a near field transducer (NFT); depositing a second layer over the entire surface of the first layer; depositing a photoresist material layer over the entire surface of the second layer, the photoresist material layer having a bottom surface in contact with the second layer and an opposing top surface; exposing the photoresist material layer to radiation through the bottom surface of the photoresist material layer via the NFT to form a first exposed region; and exposing the photoresist material layer to radiation through the top surface of the photoresist material layer to form a second exposed region.

17 Claims, 6 Drawing Sheets

(51) Int. Cl.
  *G11B 5/10* (2006.01)
  *G11B 5/00* (2006.01)
  *G11B 5/60* (2006.01)
  *G11B 5/48* (2006.01)

(56) References Cited

U.S. PATENT DOCUMENTS

| | | | |
|---|---|---|---|
| 5,846,441 A | 12/1998 | Roh | |
| 5,985,163 A | 11/1999 | Cha | |
| 5,986,851 A | 11/1999 | Angelo | |
| 6,359,754 B1 | 3/2002 | Riddering | |
| 6,433,965 B1 | 8/2002 | Gopinathan | |
| 7,746,597 B2 | 6/2010 | Huang | |
| 8,014,104 B2 | 9/2011 | Cheng | |
| 8,413,317 B1* | 4/2013 | Wan | G11B 5/3163 216/22 |
| 8,486,286 B1* | 7/2013 | Gao | G11B 5/1278 216/22 |
| 8,634,280 B1* | 1/2014 | Wang | G11B 5/3116 360/125.31 |
| 8,721,902 B1* | 5/2014 | Wang | G11B 5/314 216/22 |
| 8,947,986 B1* | 2/2015 | Araki | G11B 5/314 369/112.27 |
| 9,019,803 B1* | 4/2015 | Jin | G11B 13/08 369/13.33 |
| 2003/0198146 A1 | 10/2003 | Rottmayer | |
| 2005/0270694 A1 | 12/2005 | Umehara | |
| 2006/0083116 A1 | 4/2006 | Rottmayer | |
| 2006/0092570 A1 | 5/2006 | Payne | |
| 2009/0185314 A1 | 7/2009 | Hachisuka | |
| 2010/0202081 A1 | 8/2010 | Shimazawa | |
| 2010/0222180 A1 | 9/2010 | Takizawa | |
| 2010/0265618 A1 | 10/2010 | Boutaghou | |
| 2011/0294398 A1* | 12/2011 | Hu | B24B 37/013 451/5 |
| 2013/0163117 A1 | 6/2013 | Bhatia | |
| 2014/0241139 A1 | 8/2014 | Nishijima | |
| 2015/0340052 A1* | 11/2015 | Sankar | G11B 5/6088 369/13.33 |

FOREIGN PATENT DOCUMENTS

| | | |
|---|---|---|
| JP | H08-180352 | 7/1996 |
| JP | 2007-149158 | 6/2007 |
| JP | 2008-234828 | 10/2008 |
| WO | WO 98/14935 | 4/1998 |

* cited by examiner

METHODS OF FORMING MAGNETIC DEVICES WITH VARIABLE OVERCOATS

PRIORITY

This application claims priority to U.S. Provisional Application No. 62/210,522 entitled, METHODS OF FORMING MAGNETIC DEVICES WITH VARIABLE OVERCOATS, filed on Aug. 27, 2015 the disclosure of which is incorporated herein by reference thereto.

BACKGROUND

The heat assisted magnetic recording (HAMR) process can involve an environment that can be extremely corrosive because of the high temperature and exposure to corrosive chemistries. Furthermore, designs using close head-media spacing will experience more rapid wear of any narrow, protruded features such as write poles. Because of the harsh environment and the desire to protect some of the more delicate structures, for example the near field transducer (NFT) and the write pole for example, there remains a need for methods for forming overcoats.

SUMMARY

Disclosed are methods that include depositing a first layer over the entire surface of a structure, the structure having a magnetic reader and a magnetic writer, wherein the magnetic reader and the magnetic writer are positioned adjacent to each other on a substrate and the magnetic writer includes a near field transducer (NFT); depositing a second layer over the entire surface of the first layer; depositing a photoresist material layer over the entire surface of the second layer, the photoresist material layer having a bottom surface in contact with the second layer and an opposing top surface; exposing the photoresist material layer to radiation through the bottom surface of the photoresist material layer via the NFT to form a first exposed region; and exposing the photoresist material layer to radiation through the top surface of the photoresist material layer to form a second exposed region.

Also disclosed are methods that include forming a structure, the structure having a magnetic reader, a magnetic writer and an underlying optical waveguide, wherein the magnetic reader and the magnetic writer are positioned adjacent to each other on a substrate, the magnetic writer including a near field transducer (NFT) and the optical waveguide is configured to transmit radiation to the NFT; depositing a first layer over the entire surface of the structure; depositing a second layer over the entire surface of the first layer; depositing a photoresist material layer over the entire surface of the second layer, the photoresist material layer having a bottom surface in contact with the second layer and an opposing top surface; exposing the photoresist material layer to radiation through the bottom surface of the photoresist material layer via the NFT to form a first exposed region; exposing the photoresist material layer to radiation through the top surface of the photoresist material layer to form a second exposed region; forming a writer hard mask over the magnetic writer by using the first and second exposed regions; and etching a portion of the first layer not protected by the writer hard mask.

Also disclosed are methods that include forming a structure, the structure having a magnetic reader, a magnetic writer and an underlying optical waveguide, wherein the magnetic reader and the magnetic writer are positioned adjacent to each other on a substrate, the magnetic writer including a near field transducer (NFT) and the optical waveguide is configured to transmit radiation to the NFT; depositing a first layer over the entire surface of the structure; depositing a second layer over the entire surface of the first layer; depositing a photoresist material layer over the entire surface of the second layer, the photoresist material layer having a bottom surface in contact with the second layer and an opposing top surface; exposing the photoresist material layer to radiation through the bottom surface of the photoresist material layer via the NFT to form a first exposed region; exposing the photoresist material layer to radiation through the top surface of the photoresist material layer to form a second exposed region; removing non-exposed regions of the photoresist material; removing portions of the second layer not protected by the first and second exposed regions of the photoresist material to form a writer hard mask over the magnetic writer; removing the first and second exposed regions of the photoresist material; etching a portion of the first layer not protected by the writer hard mask; and depositing a coating of a second protective material over the entire structure.

Also disclosed are magnetic devices that include a magnetic reader; a magnetic writer; and a variable overcoat, the variable overcoat positioned over at least the magnetic reader and writer, the variable overcoat including an overcoat layer, the overcoat layer having a substantially constant thickness and material; and at least one disparate overcoat portion, the disparate overcoat portion positioned over the magnetic writer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
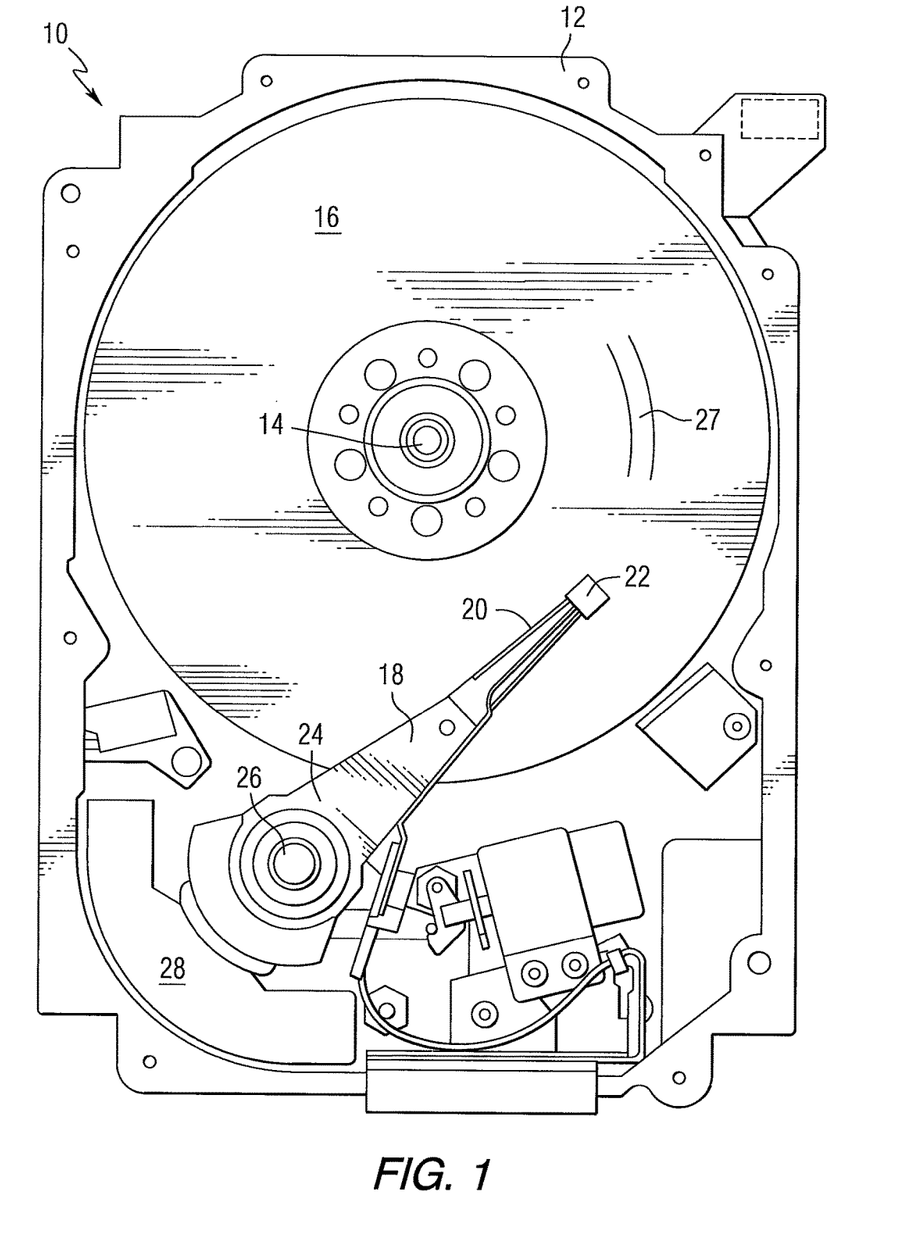
FIG. 1 is a pictorial representation of a data storage device in the form of a disc drive that can include a recording head constructed in accordance with an aspect of this disclosure.

Disclosed herein are devices that include NFTs and methods of making them. FIG. 1 is a pictorial representation of a data storage device in the form of a disc drive 10 that can utilize disclosed NFTs. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit. While FIG. 1 shows a disc drive, disclosed NFTs can be utilized in other devices that include a near field transducer.

Figure 2:
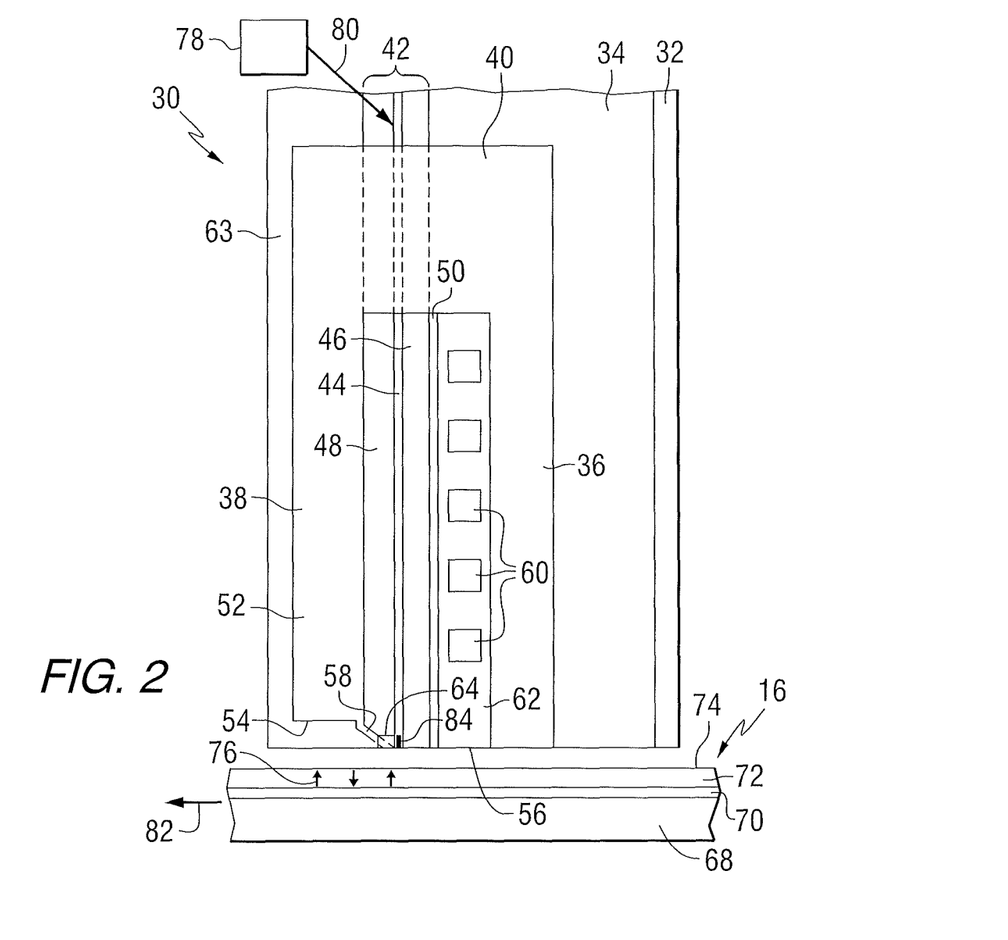
FIG. 2 is a side elevation view of a recording head constructed in accordance with an aspect of the invention.

FIG. 2 is a side elevation view of a recording head that may include a disclosed NFT; the recording head is positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material, such as for example Au.

As illustrated in FIG. 2, the recording head 30 includes a structure for heating the magnetic storage media 16 proximate to where the write pole 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer of the media.

During use of the system, the storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source can produce energy having a wavelength of 830 nm, for example. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. Energy delivered by the NFT 84 is the primary means of heating the media. A near-field transducer (NFT) 84 is positioned in or adjacent to the waveguide and at or near the air bearing surface. The design may incorporate a heat sink made of a thermally conductive material integral to, or in direct contact with, the NFT 84, and chosen such that it does not prevent coupling of electromagnetic energy into and out of the NFT 84. The heat sink may be composed of a single structure or multiple connected structures, positioned such that they can transfer heat to other metallic features in the head and/or to the gas flow external to the recording head.

Although the example of FIG. 2 shows a perpendicular magnetic recording head and a perpendicular magnetic storage media, it will be appreciated that the disclosure may also be used in conjunction with other types of recording heads and/or storage media as well. It should also be noted that disclosed devices can also be utilized with magnetic recording devices other than HAMR devices.

Figure 3:
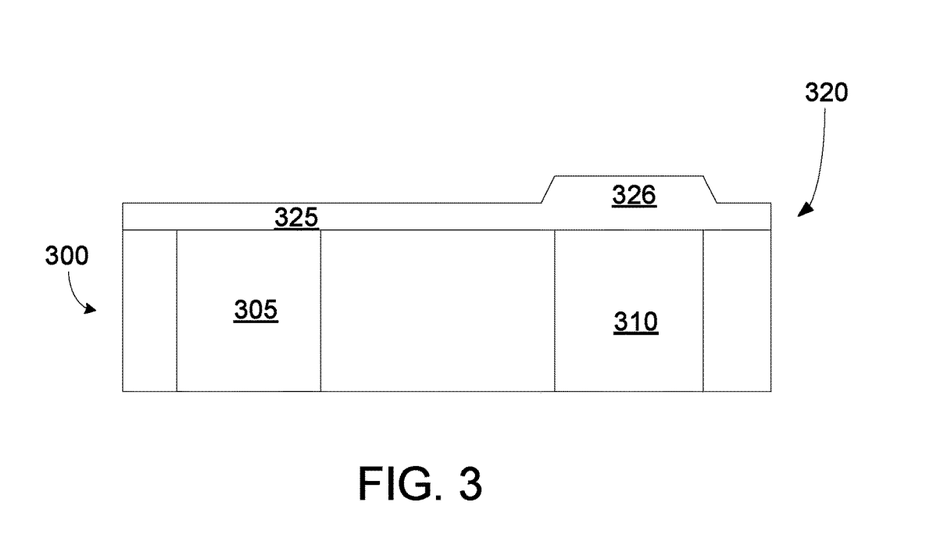
FIG. 3 is a cross section of an illustrative disclosed device.

FIG. 3 depicts a cross section of a device 300. The device 300 can include a magnetic reader 305 and a magnetic writer 310. The magnetic reader 305 and magnetic writer 310 can have details such as those discussed above. In some embodiments, the magnetic writer 310 can also include a NFT, such as those discussed above. The device also includes a variable overcoat 320. The variable overcoat 320 is positioned over at least the magnetic reader and writer. In some embodiments, the variable overcoat can be positioned over more than just the magnetic reader and writer. The variable overcoat can be a continuous layer, or a non-continuous layer that is positioned over at least a portion of the device on the air bearing surface of the device. In some embodiments, variable overcoats can also include regions that are continuous as well as non-continuous regions; such variable overcoats are described herein as non-continuous.

The variable overcoat 320 can be described as including an overcoat layer 325 and at least one disparate overcoat portion 326. The overcoat layer 325 can generally be described as having a substantially constant thickness, in some embodiments, an overcoat layer having a thickness within ±5 Å can be considered as having a substantially constant thickness. The overcoat layer 325 can also be described as being made of substantially the same material over the entirety of the overcoat layer.

Disclosed variable overcoats also generally include at least one disparate overcoat portion 326. A disparate overcoat portion is a portion of the variable overcoat that can have a substantially different thickness than the overcoat layer, can include a different material than the overcoat layer, or a combination thereof. A substantially different thickness is a thickness that is at least 5 Å thicker or thinner than the average thickness of the overcoat layer. The at least one disparate overcoat portion can be a discrete unconnected portion or it can be a contiguous part of the variable overcoat. Disclosed variable overcoats can include one or more than one disparate overcoat portions.

A particular disclosed embodiment of a device can include a variable overcoat that includes a disparate overcoat portion 326 that is positioned over the magnetic writer/NFT. The disparate overcoat portion 326 and the overcoat layer 325 make up a variable overcoat layer. The disparate overcoat portion 326 can include a different material than the overcoat layer, can include the same material(s) as the overcoat layer but have a different thickness, or can include at least one different material than the overcoat layer and have a different thickness.

Figure 4:
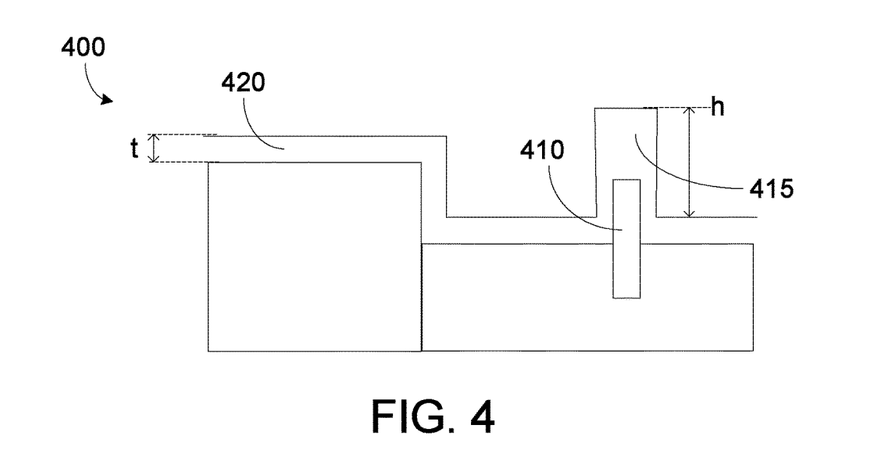
FIG. 4 is a side view of a schematic depiction of a portion of a disclosed device from a cross track direction.

FIG. 4 shows a side view of a device looking crosstrack, with the ABS at the top of the image. The device 400 includes a writer 410, which is not shown in any detail and can include a writer, and/or a NFT, and a variable overcoat layer that includes an overcoat layer 420 and at least one disparate overcoat region 415. The overcoat layer 420 can be described by an average height, or thickness, t, as shown in FIG. 4. In some embodiments, the overcoat layer can have a thickness, t, from 5 Å to 100 Å, for example. FIG. 4 also shows the height h of the disparate overcoat region 415. The height h of the disparate overcoat region can either be characterized independently or can be characterized with respect to (or as x thicker than) the thickness t of the overcoat layer. Particular heights, h, of the disparate overcoat region can be chosen based on a number of different factors. In some embodiments, disparate overcoat regions can have heights from 5 Å to 60 Å, for example.

Such embodiments can be useful in HAMR devices. The HAMR recording process can involve an environment that can be extremely corrosive due to high temperature and exposure to corrosive chemistries. Typically, diamond like carbon (DLC) has been used to protect the write pole material from corrosion. The DLC can also protect features from erosion due to mechanical wear. Instances have been seen in which the DLC has been unable to completely mitigate write pole corrosion. In addition, localized thermal protrusion during the HAMR recording process can subject the writer region to significant burnishing, which in turn can remove a protective head overcoat and accelerate the corrosion process. The aggressive HAMR environment can also lead to DLC failure over the NFT device which can allow migration of the NFT material and eventual device failure. A disparate overcoat portion over the magnetic writer/NFT can function to improve thermal, chemical, and mechanical reliability in the local writer and NFT region. Such a disparate overcoat portion may also be advantageous because it does not increase the thickness of the overcoat over the reader, which increases the head to media spacing (HMS) resulting in a significant performance penalty.

In some embodiments having a disparate overcoat portion over the writer/NFT, the disparate overcoat portion can have a greater thickness than the overcoat layer. In some embodiments, the disparate overcoat portion can be about twice as thick than the overcoat layer. In some embodiments, the disparate overcoat portion can have a thickness from 30 Å to 70 Å; and the overcoat layer can have a thickness from 5 Å to 45 Å. In some embodiments, the disparate overcoat portion can have a thickness from 40 Å to 60 Å; and the overcoat layer can have a thickness from 15 Å to 35 Å. In some embodiments, the disparate overcoat portion can have a thickness of 50 Å; and the overcoat layer can a thickness of 25 Å.

In some embodiments having a disparate overcoat portion over the writer/NFT, the disparate overcoat portion can include a different material than the overcoat layer. In some embodiments, the disparate overcoat portion and the overcoat layer can include the same material, but one of them also includes a different material. Different materials can be distributed throughout the entire thickness of the disparate overcoat portion (or overcoat layer) or can be in a different layer of the disparate overcoat portion (or overcoat layer). In some embodiments, both the disparate overcoat portion and the overcoat layer can include diamond like carbon (DLC) and one of them can also include an additional material. In some embodiments, both the disparate overcoat portion and the overcoat layer can include diamond like carbon (DLC) and the disparate overcoat portion can also include a second material. In some embodiments, both the disparate overcoat portion and the overcoat layer can include diamond like carbon (DLC) and the disparate overcoat portion can also include oxides, nitrides, carbides, or borides of Tantalum, Titanium, Magnesium, Nickel, Chromium, Beryllium, Zirconium, Silicon, or similar materials. In some embodiments, the disparate overcoat portion can include TaOx.

In some devices, particularly those that include a NFT, the reader and the writer are relatively close together. If the disparate overcoat portion is inadvertently extended over the reader, the reliability of the reader will suffer; the device would be more likely to make contact with media; or both. Therefore, the ability to control the placement of the disparate overcoat portion becomes very important. Disclosed methods include two different steps of exposing the photo resist. The first step exposes the photoresist through the bottom surface of the photoresist layer and the second step exposes the photoresist layer through the top surface of the photoresist. The first step, which exposes the photoresist through the bottom surface, utilizes the waveguide/NFT structure itself to generate or transmit the radiation that exposes the photoresist. This two step photoresist method will be explained in the context of a larger method that utilizes it to form a disclosed device.

FIGS. 5A through 5K depict an illustrative schematic of a device undergoing a disclosed method. It should be noted that FIGS. 5A to 5K show a substrate 501. The substrate 501 can include devices and structures formed therein and thereon, for example the substrate can include a magnetic reader, a magnetic writer, a NFT, a contact pad, or combinations thereof. The particular illustrative device depicted in FIGS. 5A through 5K includes a reader 505 and a writer 510. The writer 510 can include a NFT, depicted in the figures as NFT 511. The writer 510 can also include a contact pad (not depicted in the figures). The reader and writer (including the NFT, the contact pad, etc.) can have characteristics including for example those depicted above.

Figure 5A:
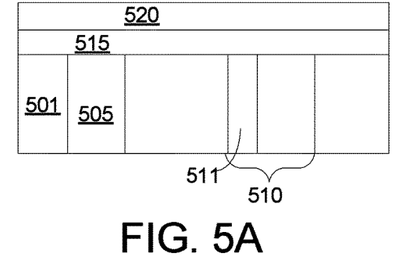
FIGS. 5A to 5K depict cross sections of articles at various stages of completion of a disclosed method.

The structure in FIG. 5A also includes a first layer 515. The first layer 515 can include oxides, nitrides, carbides, or borides of Tantalum, Titanium, Magnesium, Nickel, Chromium, Beryllium, Zirconium, Silicon, or similar materials. In some embodiments, the first layer can include TaOx. The material of the first layer can ultimately function as a protective layer for a portion thereof for the underlying devices. As such, the material of the first layer can be a material that can function to protect structures or layers underneath it. As such, the first layer 515 can include, for example diamond like carbon (DLC), TaOx, CSiN, or similar materials. The structure in FIG. 5A also includes a second layer 520. The second layer 520 can include a material that can later function as a hard mask material. Illustrative hard mask materials can include, for example alumina ($Al_2O_3$). In some embodiments, the first layer 515 and the second layer 520 can be somewhat coextensive, or substantially coextensive and can cover at least the area over the reader 505 and the writer 510, for example.

Figure 5B:
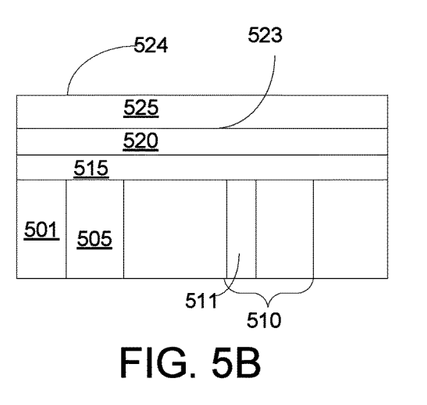

FIG. 5B depicts the device once a photoresist layer 525 has been formed on the second layer 520. The photoresist layer can include any photoresist material. In general, a photoresist material can be described as a material that is easily removed unless it has been exposed to radiation (e.g., UV radiation). Stated differently, photoresist material exposed to radiation will withstand various processing steps that photoresist material not exposed to radiation will not withstand. The photoresist layer 525 has a surface in contact with the second layer 520, referred to herein as a bottom surface 523 and an opposing surface, referred to herein as a top surface 524.

Figure 5C:
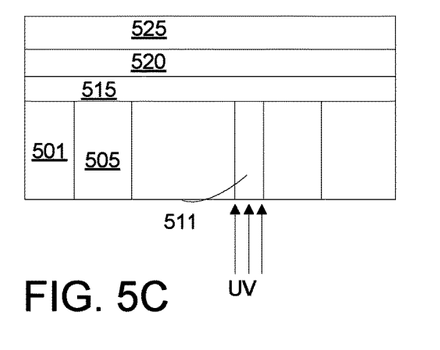

FIG. 5C depicts exposure of the bottom surface 523 of the photoresist layer 525 to radiation. The radiation is produced by a source, transmitted to a waveguide then to the NFT and out of the NFT to the bottom surface 523 of the photoresist layer 525. An illustrative configuration of a waveguide and NFT can be seen in FIG. 2 (the waveguide 42 and the NFT 84). The source of the radiation for exposing the bottom surface 523 of the photoresist layer 525 is not necessarily the source 80 depicted in FIG. 2 but can be a different source of radiation. The radiation from the NFT 511 affects the photoresist layer 525 through its bottom surface 523. The radiation that exits the NFT 511 will have substantially the same dimensions as the NFT 511 and will be substantially aligned with the edge of the NFT 511. The NFT 511 in combination with the radiation from the waveguide functions to form an aligned exposed portion of the photoresist layer 525 directly above the NFT 511.

Figure 5D:
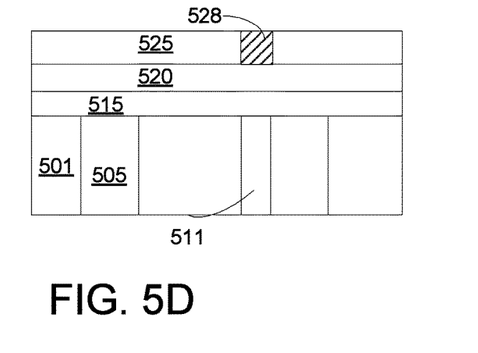
Figure 5E:
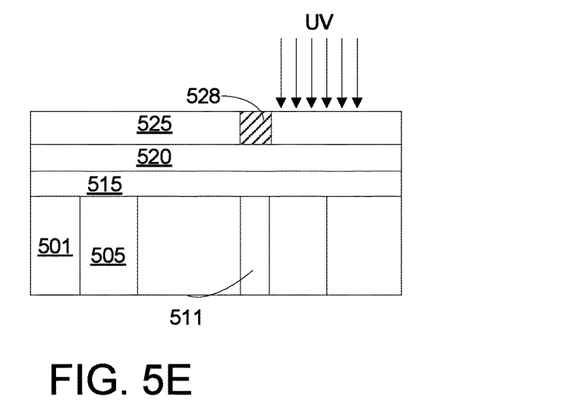

This NFT aligned portion 528 of the photoresist layer 525 can be seen in FIG. 5D. The next step in disclosed methods is to expose another portion of the photoresist layer 525 to radiation. This exposure step exposes the photoresist layer 525 through the top surface 524. This exposure step can be accomplished using known photolithography steps and tools. Exposure of the photoresist layer 525 to radiation through the top surface 524 is depicted in FIG. 5E.

Figure 5F:
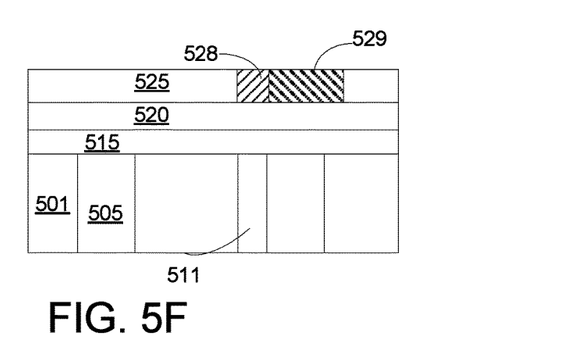

The step of exposing the top surface 524 of the photoresist layer 525 forms a second exposed portion 529 of the photoresist layer 525, as seen in FIG. 5F. It should be noted that the second exposed portion 529 can, but need not overlap the NFT aligned portion 528. It should also be noted that the second exposed portion 529 is on the side of the NFT aligned portion 528 opposite the reader 505. This configuration allows the NFT aligned portion 528 to define the reader side of what will ultimately become a disparate overcoat region of the structure over the NFT. Because of this configuration, the disparate overcoat region over the NFT takes advantage of the self aligning afforded by exposing the photoresist layer via the NFT.

Further steps can also be undertaken. For example, the unexposed photoresist can be remove, the second layer can be removed where not protected by the exposed photoresist, the remaining hard mask can be utilized to protect a portion of the first layer from etching and then the hard mask can be removed. Optionally, a second protective layer can then be coated on the entire structure. A specific illustration of these steps can be seen in FIGS. 5G through 5K and is discussed below.

Figure 5G:
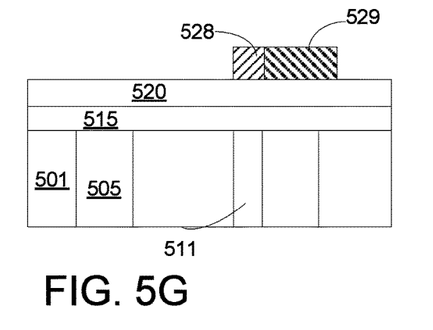
Figure 5H:
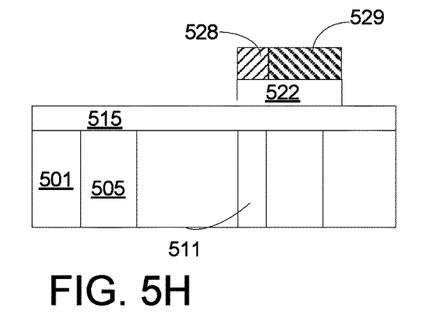

The next step includes removing the unexposed regions of the photoresist layer 525. This can be done using known developing steps and processes. The structure after completion of this step is depicted in FIG. 5G. As seen there, the only portions of the photoresist material that remain are those that were exposed to the radiation, the NFT aligned portion 528 and the second exposed portion 529. After this, the areas of the second layer 520 (e.g., the hard mask material) that are not protected by the remaining exposed photoresist can be removed. This can be accomplished using, for example wet or dry etching methods. For example, the unprotected portions of the second layer can be removed using potassium hydroxide (KOH) etching. The structure after removing the non-protected portions of the second layer is seen in FIG. 5H.

Figure 5I:
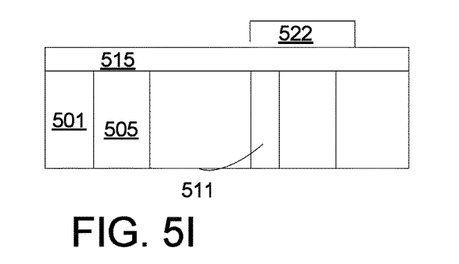

The steps of this particular illustrated method up to this point were meant to obtain an aligned hard mask over the writer 510. This aligned hard mask is obtained by removing the remaining exposed photoresist material. The structure after removing the remaining photoresist material is seen in FIG. 5I. The writer hard mask 522 is all that remains over the first layer 515. The writer hard mask 522 is then utilized to protect the entire depth of the underlying portion of the first layer 515 while a portion of the non-protected first layer 515 is removed, by etching for example. This step removes some portion of the thickness of the first layer 515 over the reader 505 while simultaneously protecting the entire thickness of the first layer 515 over the writer 510.

Figure 5J:
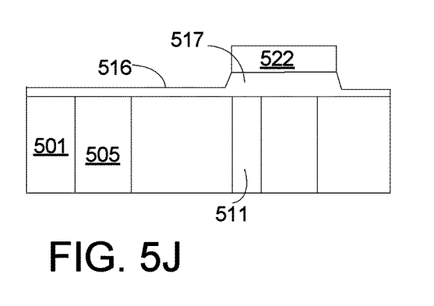
Figure 5K:
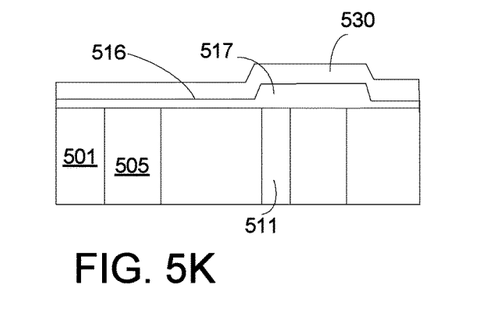

The structure upon completion of this etching step can be seen in FIG. 5J. The structure now includes a partial thickness first layer 516 and an entire thickness portion 517. The writer hard mask 522 remains until it is removed. After it is removed, the entire structure can then be coated in a second protective layer 530 as seen in FIG. 5K. This second protective material can be the same or different than the material of the first layer. In some embodiments, the second protective material can be different and can be DLC for example. The second protective layer 530 can have substantially the same thickness across the entire structure but because of the underlying difference in the thickness of the first layer (partial thickness first layer 516 and entire thickness portion 517) the resulting structure has a variable thickness.

In some specific illustrative embodiments, a first layer can include a layer of TaOx, for example. This TaOx layer can have a thickness from about 25 Å to about 75 Å. In some embodiments it can have a thickness from about 35 Å to about 60 Å. In some embodiments, the writer hard mask can have dimensions of 60 μm wide. In some specific illustrative embodiments, a second protective layer can include DLC. The DLC cap layer, if present can have a thickness from about 5 Å to about 15 Å. In some embodiments, it can have a thickness of about 10 Å.

Figure 6:
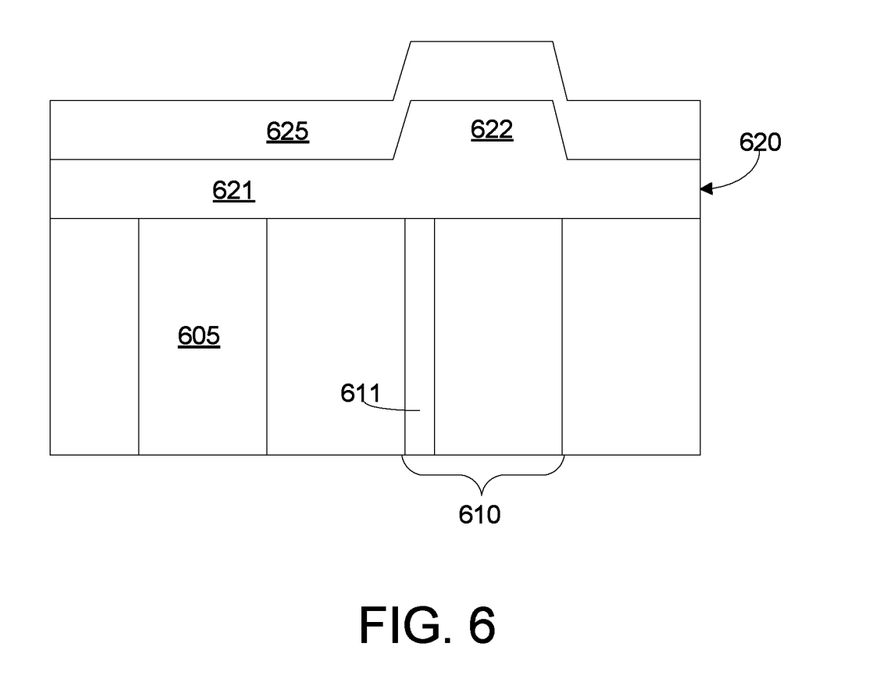
FIG. 6 is an illustration of an article that can be formed using various methods disclosed herein.

FIG. 6 illustrates a device that can be made using disclosed methods. The device can include a reader 605 and a writer 610. The writer 610 can include, amongst other possible items, a NFT 611. The device also includes a first protective layer 620 that includes an overcoat layer 621 and a disparate overcoat region 622. The disparate overcoat region 622 is positioned over the writer 610. On top of the first protective layer 620 is a second protective layer 625. In some embodiments, the first protective layer 620 can include TaOx and the second protective layer 625 can include DLC. The disparate overcoat region 622 is not positioned over the reader 605 even though the reader 605 and writer 610 are positioned very close. This is important because if the disparate overcoat region 622 is inadvertently extended over the reader 605, the reliability of the reader will suffer; the device would be more likely to make contact with media; or both. Therefore, the ability to control the placement of the disparate overcoat region 622 can be very advantageous.

Thus, embodiments of methods of forming magnetic devices with variable overcoats are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method comprising:
   depositing a first layer over the entire surface of a structure, the structure comprising a magnetic reader and a magnetic writer, wherein the magnetic reader and the magnetic writer are positioned adjacent to each other on a substrate and the magnetic writer comprises a near field transducer (NFT);
   depositing a second layer over the entire surface of the first layer;
   depositing a photoresist material layer over the entire surface of the second layer, the photoresist material layer having a bottom surface in contact with the second layer and an opposing top surface;
   exposing the photoresist material layer to radiation through the bottom surface of the photoresist material layer via the NFT to form a first exposed region; and
   exposing the photoresist material layer to radiation through the top surface of the photoresist material layer to form a second exposed region.

2. The method according to claim 1, wherein the NFT transmits radiation from a waveguide configured to function in combination with the NFT.

3. The method according to claim 1 further comprising using the first and second exposed regions to form a writer hard mask over the writer.

4. The method according to claim 3 further comprising etching a portion of the first layer not protected by the writer hard mask.

5. The method according to claim 1, wherein the first layer comprises tantalum oxide ($TaO_x$).

6. The method according to claim 1, wherein the first layer has a thickness from about 5 Å to about 100 Å.

7. The method according to claim 4 further comprising removing the writer hard mask.

8. The method according to claim 7 further comprising depositing a blanket coating of a second protective material over the entire structure.

9. The method according to claim 8, wherein the second protective material comprises diamond like carbon (DLC).

10. A method comprising:
    forming a structure, the structure comprising a magnetic reader, a magnetic writer and an underlying optical waveguide, wherein the magnetic reader and the magnetic writer are positioned adjacent to each other on a substrate, the magnetic writer comprises a near field transducer (NFT) and the optical waveguide is configured to transmit radiation to the NFT;
    depositing a first layer over the entire surface of the structure;
    depositing a second layer over the entire surface of the first layer;
    depositing a photoresist material layer over the entire surface of the second layer, the photoresist material layer having a bottom surface in contact with the second layer and an opposing top surface;
    exposing the photoresist material layer to radiation through the bottom surface of the photoresist material layer via the NFT to form a first exposed region;
    exposing the photoresist material layer to radiation through the top surface of the photoresist material layer to form a second exposed region
    forming a writer hard mask over the magnetic writer by using the first and second exposed regions; and
    etching a portion of the first layer not protected by the writer hard mask.

11. The method according to claim 10, wherein the first layer comprises diamond like carbon (DLC), $TaO_x$ or CSiN.

12. The method according to claim 10, wherein the first layer comprises $TaO_x$.

13. The method according to claim 10, wherein the first layer has a thickness from about 5 Å to about 100 Å.

14. The method according to claim 10, wherein the second layer comprises $Al_2O_3$.

15. The method according to claim 10 further comprising removing the writer hard mask after etching the portion of the first layer.

16. The method according to claim 15 further comprising depositing a coating of a second protective material over the entire structure after removing the writer hard mask.

17. The method according to claim 16, wherein the second protective material comprises DLC.

* * * * *